(12) United States Patent
Sakai

(10) Patent No.: US 11,455,023 B2
(45) Date of Patent: Sep. 27, 2022

(54) POWER MODULE

(71) Applicant: Mitsubishi Electric Corporation, Tokyo (JP)

(72) Inventor: Masaki Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 38 days.

(21) Appl. No.: 16/991,374

(22) Filed: Aug. 12, 2020

(65) Prior Publication Data
US 2021/0149473 A1 May 20, 2021

(30) Foreign Application Priority Data

Nov. 20, 2019 (JP) ............................. JP2019-209886

(51) Int. Cl.
*G06F 1/3234* (2019.01)
*G06F 11/07* (2006.01)
*G06F 1/3206* (2019.01)

(52) U.S. Cl.
CPC .......... *G06F 1/3243* (2013.01); *G06F 1/3206* (2013.01); *G06F 11/0751* (2013.01)

(58) Field of Classification Search
CPC ... G06F 1/3243; G06F 1/3206; G06F 11/0751
See application file for complete search history.

(56) References Cited

U.S. PATENT DOCUMENTS

| | | | | |
|---|---|---|---|---|
| 5,777,870 A * | 7/1998 | Takaku | .............. | G05B 19/4182 713/400 |
| 7,253,577 B2 * | 8/2007 | Campbell | ........... | H02P 29/0241 318/563 |
| 8,538,558 B1 * | 9/2013 | Sabapathy | .......... | G06F 11/0796 700/4 |
| 9,601,988 B2 * | 3/2017 | Takayama | .............. | H02M 5/297 |
| 2008/0253048 A1 * | 10/2008 | Kamizawa | ................ | H04N 5/63 361/62 |
| 2009/0052211 A1 * | 2/2009 | Asai | .................... | H03K 17/0822 363/56.05 |
| 2010/0309589 A1 * | 12/2010 | Ueki | ....................... | H02M 1/08 361/18 |
| 2011/0074522 A1 * | 3/2011 | Lee | .......................... | H03J 5/244 333/174 |

(Continued)

FOREIGN PATENT DOCUMENTS

JP H07-107771 A 4/1995

*Primary Examiner* — Aurel Prifti
(74) *Attorney, Agent, or Firm* — Studebaker & Brackett PC

(57) ABSTRACT

A power module according to the first embodiment incorporates a power device, and drives the power device by using a control signal acquired from a microcomputer being a control circuit. The power module includes: a plurality of first terminals that receive input of the control signal from the microcomputer; a main circuit that drives the power device based on the control signal, and detects an abnormality of the power module; an error output circuit that outputs an error signal from a second terminal to the microcomputer when the abnormality is detected by the main circuit; and a switching circuit that causes the first terminal to operate as an output terminal for the microcomputer when the error signal is output. Information of the power device is output from the first terminal operating as the output terminal to the microcomputer.

5 Claims, 4 Drawing Sheets

(56) References Cited

U.S. PATENT DOCUMENTS

| | | | | |
|---|---|---|---|---|
| 2011/0215751 | A1* | 9/2011 | Sato | H02M 7/53875 |
| | | | | 318/490 |
| 2013/0223115 | A1* | 8/2013 | Tsuchiya | H02M 1/0845 |
| | | | | 363/68 |
| 2013/0257332 | A1* | 10/2013 | Nakano | H02P 29/0241 |
| | | | | 318/490 |
| 2013/0320903 | A1* | 12/2013 | Aalund | H02H 7/1225 |
| | | | | 318/490 |
| 2014/0176091 | A1* | 6/2014 | Chiang | H02M 3/158 |
| | | | | 323/234 |
| 2014/0347767 | A1* | 11/2014 | Nakamura | H02H 7/1213 |
| | | | | 361/18 |
| 2018/0337624 | A1* | 11/2018 | Moritake | H02P 3/22 |
| 2020/0186058 | A1* | 6/2020 | Yukawa | B60L 15/20 |

* cited by examiner

F I G. 5
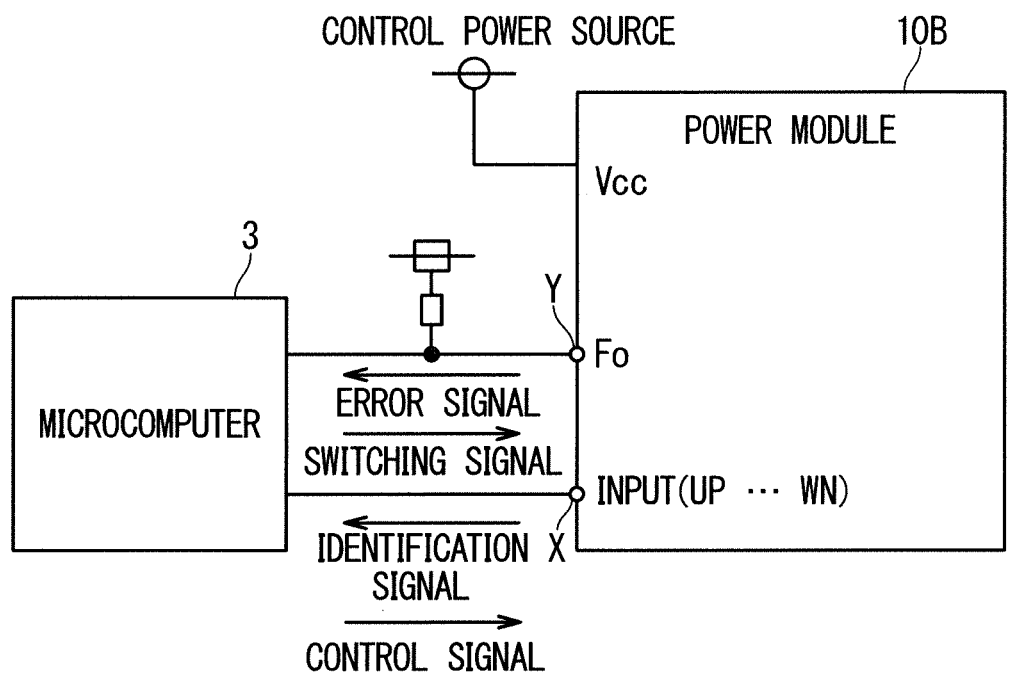

POWER MODULE

BACKGROUND OF THE INVENTION

Field of the Invention

The present invention relates to a technology of outputting information of a power device from a power module.

Description of the Background Art

In a power module that uses a power device as its output element, dedicated wiring has hitherto been necessary for reading information of the power device from the outside (for example, Japanese Patent Application Laid-Open No. 7-107771 (1995)).

When dedicated wiring is added to a power module for the purpose of reading information of a power device, however, an interface of a reader that reads the information of the power device needs to be changed. This necessitates new designing in a device such as a substrate when an existing product is replaced, which has been posing a problem of requiring costs and time for development.

SUMMARY

The present invention has an object to provide a power module that enables output of information of a power device without changing interfaces of a reader that reads information.

A power module of the present invention incorporates a power device, and drives the power device by using a control signal acquired from a control circuit. The power module of the present invention includes a plurality of first terminals, a main circuit, an error output circuit, and a switching circuit. The plurality of first terminals are configured to receive input of the control signal from the control circuit. The main circuit is configured to drive the power device based on the control signal, and detect an abnormality of the power module. The error output circuit is configured to output an error signal from a second terminal to the control circuit when the abnormality is detected by the main circuit. The switching circuit is configured to cause at least one of the plurality of first terminals to operate as an output terminal for the control circuit when the error signal is output. Information of the power device is output from the at least one of the plurality of first terminals operating as the output terminal to the control circuit.

According to the power module of the present invention, the first terminals that normally operate as input terminals of the control signal can be used as output terminals of the information of the power device only during occurrence of an error. This configuration eliminates the need of dedicated wiring for the purpose of reading the information of the power device, and the need of changing interfaces of a reader that reads the information.

These and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a diagram illustrating a power module and a microcomputer being a control circuit of the power module according to the first embodiment.

DESCRIPTION OF THE PREFERRED EMBODIMENTS

A. First Embodiment

<A-1. Configuration>

Figure 1:
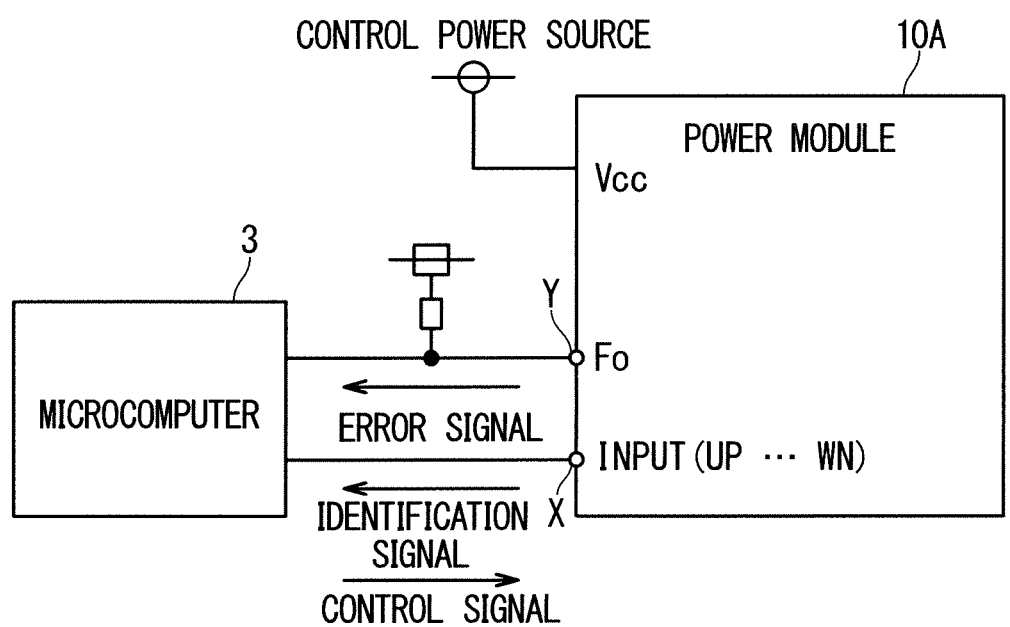
FIG. 1 is a diagram illustrating a power module and a microcomputer being a control circuit of the power module according to the first embodiment.
Figure 2:
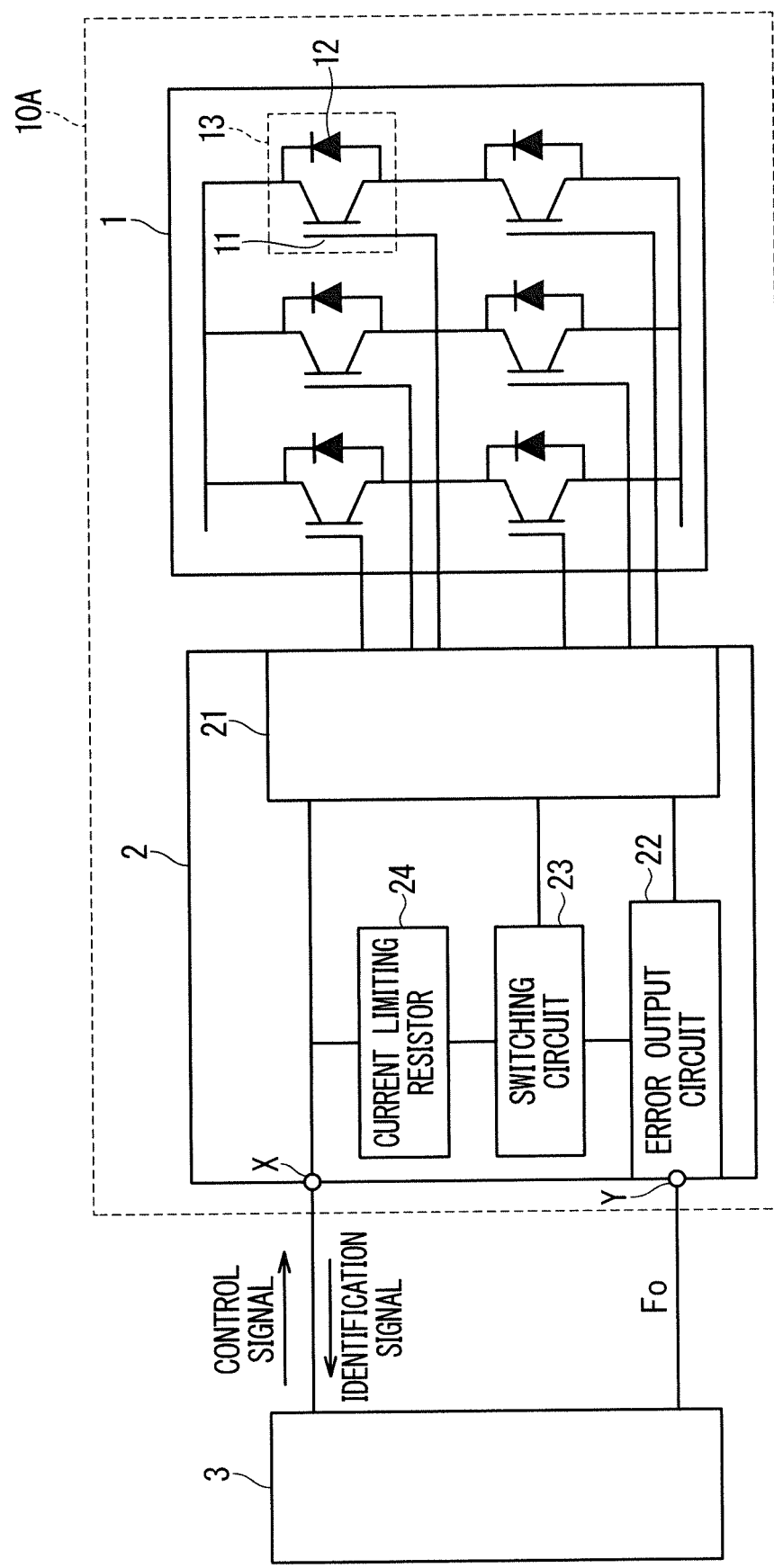
FIG. 2 is a diagram illustrating a configuration of the power module according to the first embodiment.

FIG. 1 illustrates a power module 10A and a microcomputer 3 being a control circuit of the power module 10A according to the first embodiment. FIG. 2 illustrates a configuration of the power module 10A. The power module 10A will be described below with reference to FIG. 1 and FIG. 2.

A control power source $V_{CC}$ is connected to the power module 10A.

The power module 10A includes a power device 1, and a drive circuit 2 being an IC that drives the power device 1.

In the example of FIG. 1, the power device 1 is a three-phase bridge circuit consisting of six power chips 13 each including an insulated gate bipolar transistor (IGBT) 11 and a freewheeling diode 12, and constitutes an inverter. The power device 1 performs motor operation or the like by converting DC into AC. Three power chips 13 out of the six power chips 13 are located on the high side (P side), and the other three power chips 13 are located on the low side (N side). Each of the P side and the N side has U phase, V phase, and W phase.

The drive circuit 2 includes a main circuit 21, an error output circuit 22, a switching circuit 23, a current limiting resistor 24, a first terminal X, and a second terminal Y. The main circuit 21 is provided with a protection function of detecting abnormalities of the entire power module 10A and interrupting signals to the power device 1 during an abnormal operation. Examples of the protection function provided in the main circuit 21 include short circuit protection, temperature protection, and protection from reduction of a control power source voltage. During a normal operation with no detection of abnormalities, the main circuit 21 drives the power device 1, based on a PWM signal being a control signal from the microcomputer 3 that is input to the first terminal X. In other words, the main circuit 21 operates as a protection circuit and a drive circuit. Further, during a normal operation, the first terminal X operates as an input terminal of the control signal.

The power device 1 consists of six power chips as described above, and accordingly, there are also six first terminals X. In other words, there are first terminals X of UP phase, VP phase, WP phase, UN phase, VN phase, and WN phase.

When the main circuit 21 detects an abnormality, the error output circuit 22 generates an error signal, and outputs the error signal from the second terminal Y to the microcomputer 3. Specifically, the error output circuit 22 generates an error state signal Fo indicating whether or not an abnormality is detected in the main circuit 21, and outputs the error state signal Fo from the second terminal Y to the microcomputer 3. Although not illustrated in the figure, the error output circuit 22 is an open drain circuit of a transistor, and its output is normally pulled up to 5 V by a pull-up resistor. Thus, during a normal operation, i.e., when no abnormalities are detected, the error state signal Fo is at a High (H) level. In contrast, during an abnormal operation, i.e., when an abnormality is detected, the transistor of the error output circuit 22 is turned on, shifting the error state signal Fo to a Low (L) level. The error state signal Fo at the L level is hereinafter also referred to as an error signal.

When the error output circuit 22 outputs the error signal, the switching circuit 23 switches flows of signals in the drive circuit 2, and causes the first terminal X to operate as an output terminal.

Figure 3:
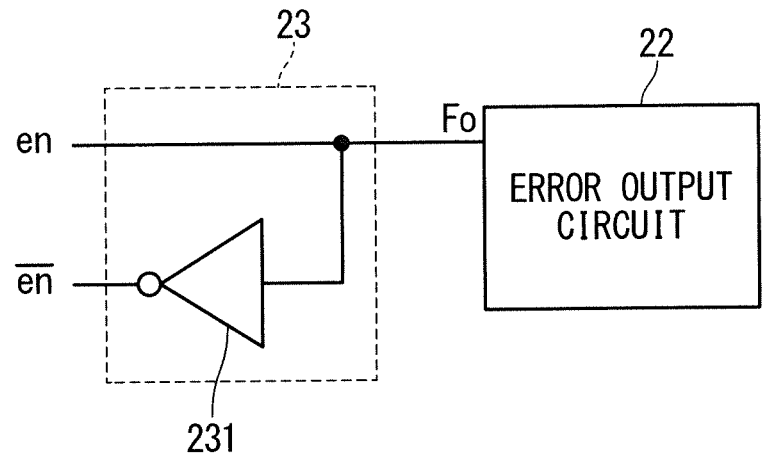
FIG. 3 is a diagram illustrating a configuration of a switching circuit.

FIG. 3 illustrates a configuration of the switching circuit 23. The switching circuit 23 includes a NOT gate 231. The error state signal Fo input to the switching circuit 23 branches into two in the switching circuit 23. One branching error state signal Fo is directly output from the switching circuit 23 as an enable signal en, and the other branching error state signal Fo is output as a disable signal en overbar having polarity being inverted by the NOT gate 231.

Figure 4:
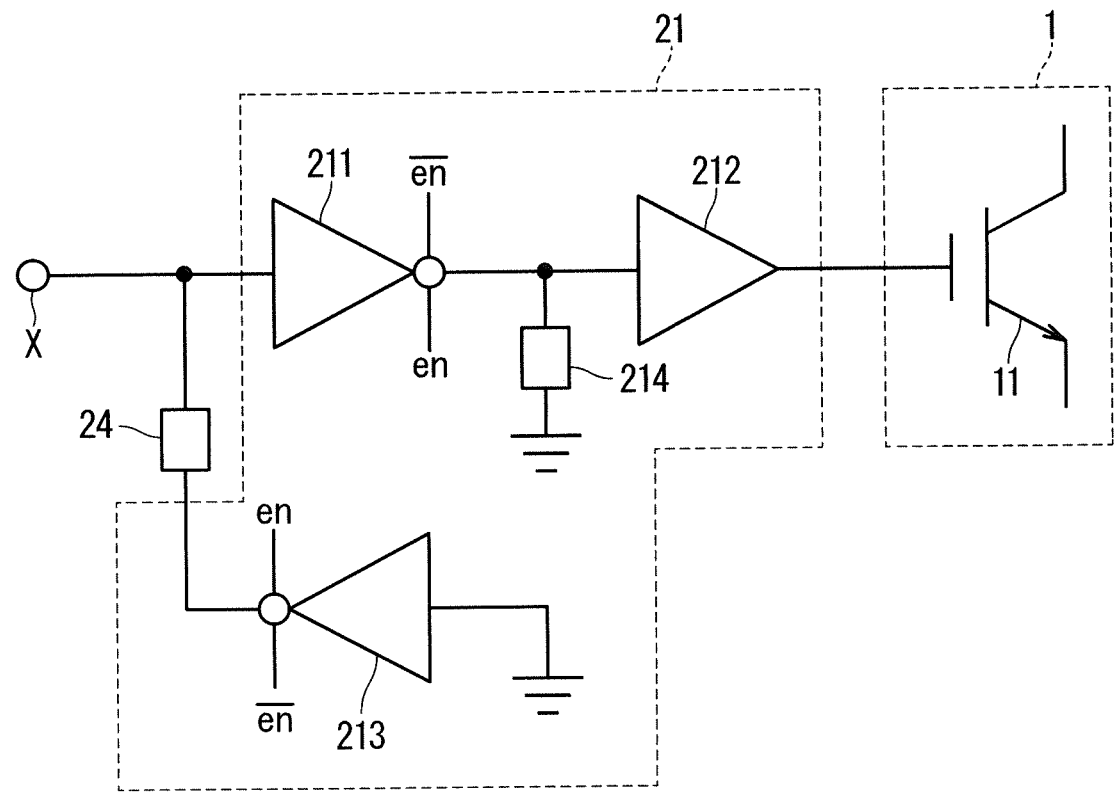
FIG. 4 is a diagram illustrating a configuration of a main circuit regarding flows of signals switched by the switching circuit.

FIG. 4 illustrates a configuration of the main circuit 21 regarding flows of signals switched by the switching circuit 23. The main circuit 21 includes NOT gates 211 and 213, a buffer 212, and a resistor 214. The NOT gate 211 has its input side being connected to the first terminal X, and its output side being connected to the buffer 212. The input side of the buffer 212 is connected to the power device 1. A branching point is formed in connection wiring between the NOT gate 211 and the buffer 212, and the branching point is connected to the ground via the resistor 214. A branching point is formed in connection wiring between the NOT gate 211 and the first terminal X, and the output side of the NOT gate 213 is connected to the branching point via a current limiting resistor 7. The input side of the NOT gate 213 is connected to the ground. Each of the NOT gates 211 and 213 includes an enable terminal and a disable terminal. The disable signal en overbar is input to the enable terminal of the NOT gate 211, and the enable signal en is input to the disable terminal thereof. In contrast, the enable signal en is input to the enable terminal of the NOT gate 213, and the disable signal en overbar is input to the disable terminal thereof. In this manner, in the NOT gates 211 and 213, the input signal to the enable terminal and the input signal to the disable terminal are inversed.

<A-2. Operation>

Next, an operation of the power module 10A will be described. During a normal operation in which the main circuit 21 detects no abnormalities of the power module 10A, the microcomputer 3 inputs the control signal to the first terminal X, and the main circuit 21 drives the power device 1, based on the control signal. In this case, the error output circuit 22 outputs the error state signal Fo at the H level. In response to receiving the error state signal Fo, the switching circuit 23 outputs the enable signal en at the H level and the disable signal en overbar at the L level. This causes the NOT gate 211 to be enabled and the NOT gate 213 to be disabled in the main circuit 21. As a result, the control signal flows in a direction from the first terminal X to the NOT gate 211, the buffer 212, and the power device 1. In other words, the first terminal X functions as an input terminal of the control signal.

When the main circuit 21 detects an abnormality of the power module 10A, the main circuit 21 interrupts signals to the power device 1. In this case, the error output circuit 22 outputs the error state signal Fo at the L level, i.e., the error signal. In response to receiving the error state signal Fo, the switching circuit 23 outputs the enable signal en at the L level and the disable signal en overbar at the H level. This causes the NOT gate to be disabled and the NOT gate 213 to be enabled in the main circuit 21. As a result, signals do not flow in a direction from the first terminal X to the NOT gate 211, but signals flow from the NOT gate 213 to the input terminal. In other words, the first terminal X functions as an output terminal. Consequently, an identification signal that includes information of the power device 1 can be output from the main circuit 21 to the microcomputer 3 via the first terminal X. Examples of the information of the power device 1 included in the identification signal herein include a rated current and a rated voltage of the power device 1.

As described above, during an abnormal operation, the power module 10A does not receive the control signal from the microcomputer 3, but outputs the error signal from the second terminal Y and also outputs the identification signal from the first terminal X. Accordingly, owing to the error signal, the microcomputer 3 can recognize whether each first terminal X functions as an input terminal of the control signal or functions as an output terminal of the identification signal.

As described above, there are as many first terminals X as there are power chips in the power device 1. Thus, the power module 10A can express various types of information of the power device 1, depending on a pattern of the H level and the L level of the output signal in each of the first terminals X. In other words, one pattern of presence or absence of output in the first terminal X corresponds to one type of information of the power device 1. In this case, the power module 10A can output various types of information to the microcomputer 3, according to patterns of presence or absence of output.

Further, the first terminals X of UP phase, VP phase, and WP phase located on the high side and the first terminals X of UN phase, VN phase, and WN phase located on the low side may output different pieces of information of the power device 1. In the drive circuit 2, a driven part on the P side uses a high voltage, while a driven part on the N side uses a constant voltage. Accordingly, in the drive circuit 2, the P side and the N side may have separate configurations. In this case, the P side and the N side of the drive circuit 2 cannot cooperate with each other. Even in such a case, when drive circuit 2 outputs different pieces of information in the first terminals X on the P side and the first terminals X on the N side, the drive circuit 2 can output these pieces of information to the microcomputer.

<A-3. Effect>

As described above, the power module 10A according to the first embodiment incorporates the power device 1, and drives the power device 1 by using the control signal acquired from the microcomputer 3 being a control circuit. The power module 10A includes: the plurality of first terminals X that receive input of the control signal from the microcomputer 3; the main circuit 21 that drives the power device 1 based on the control signal, and detects an abnormality of the power module 10A; the error output circuit 22 that outputs the error signal from the second terminal Y to the microcomputer 3 when the abnormality is detected by the main circuit 21; and the switching circuit 23 that causes the first terminal X to operate as an output terminal for the microcomputer 3 when the error signal is output. The information of the power device 1 is output from the first terminal X operating as the output terminal to the microcomputer 3. Thus, according to the power module 10A, the information of the power device 1 can be output to the microcomputer 3 during an abnormal operation by using the first terminals X that normally operate as input terminals of the control signal. This configuration eliminates dedicated wiring for outputting the information of the power device 1 from the power module 10A, and also eliminates the need for the microcomputer 3 to change interfaces for the purpose of acquiring the information of the power device 1 as well.

B. Second Embodiment

<B-1. Configuration>

FIG. 5 illustrates a power module 10B and a microcomputer 3 being a control circuit of the power module 10B according to the second embodiment. The feature of the power module 10B lies in that a switching signal from the microcomputer 3 is input to the second terminal Y being an output terminal of the error state signal Fo. In other words, the second terminal Y is an input terminal of the switching signal as well as being an output terminal of the error state signal Fo. Further, the error output circuit 22 of the power module 10B includes an input circuit (not illustrated) that receives input of the switching signal via the second terminal Y. Other configurations of the power module 10B are the same as the configurations of the power module 10A according to the first embodiment.

<B-2. Operation>

When the switching signal is input to the input circuit of the error output circuit 22 from the microcomputer 3 via the second terminal Y, the switching circuit 23 switches flows of signals in the drive circuit 2 and causes the first terminal X to operate as an output terminal, in a manner similar to when the error output circuit 22 outputs the error signal. Specifically, for example, the switching signal is a signal at the L level as with the error signal. Then, the switching circuit 23 generates the enable signal en and the disable signal en overbar based on the switching signal, in a manner similar to that in the description provided for the error signal with reference to FIG. 3.

<B-3. Effect>

As described above, when the switching signal is input from the microcomputer 3 to the error output circuit 22 via the second terminal Y, the switching circuit 23 causes the first terminal X to operate as an output terminal for the microcomputer 3, regardless of whether the error signal is generated. This configuration allows the microcomputer 3 to determine timing of reading the information of the power device 1 by itself.

Note that, in the present invention, each embodiment can be freely combined and each embodiment can be modified or omitted as appropriate within the scope of the invention.

While the disclosure has been shown and described in detail, the foregoing description is in all aspects illustrative and not restrictive. It is therefore understood that numerous modifications and variations can be devised.

What is claimed is:

1. A power module that incorporates a power device and drives the power device by using a control signal acquired from a control circuit, the power module comprising:
   a plurality of first terminals configured to receive input of the control signal from the control circuit;
   a main circuit configured to drive the power device based on the control signal, and detect an abnormality of the power module;
   an error output circuit configured to output an error signal from a second terminal to the control circuit when the abnormality is detected by the main circuit; and
   a switching circuit configured to cause at least one of the plurality of first terminals to operate as an output terminal for the control circuit when the error signal is output, wherein
   information of the power device is output from the at least one of the plurality of first terminals operating as the output terminal to the control circuit.

2. The power module according to claim 1, wherein
   a pattern of presence or absence of output in each of the plurality of first terminals during the output of the error signal corresponds to a piece of the information of the power device.

3. The power module according to claim 1, wherein
   different pieces of the information of the power device are output from at least one of the plurality of first terminals being located on a high side and receiving input of the control signal and at least one of the plurality of first terminals being located on a low side and receiving input of the control signal.

4. The power module according to claim 1, wherein
   when a switching signal is input from the control circuit to the error output circuit via the second terminal, the switching circuit causes at least one of the plurality of first terminals to operate as the output terminal for the control circuit, regardless of whether the error signal is generated.

5. The power module according to claim 1, further comprising a drive circuit including the main circuit, the error output circuit, and the switching circuit, wherein the switching circuit is further configured to switch flows of signals in the drive cuicuit to cause the at least one of the plurality of first terminals to operate as an output terminal for the control circuit when the error signal is output.

* * * * *